(12) United States Patent
Chen

(10) Patent No.: US 7,548,381 B2
(45) Date of Patent: Jun. 16, 2009

(54) COMPACT ZOOMABLE CAMERA DEVICE FOR PORTABLE DIGITAL ELECTRONIC DEVICES

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 290 days.

(21) Appl. No.: 11/402,469

(22) Filed: Apr. 12, 2006

(65) Prior Publication Data

US 2007/0070529 A1   Mar. 29, 2007

(30) Foreign Application Priority Data

Sep. 23, 2005   (CN) .................... 2005 1 0037491

(51) Int. Cl.
*G02B 15/14* (2006.01)
*G02B 7/02* (2006.01)
(52) U.S. Cl. .................... 359/694; 359/696; 359/819
(58) Field of Classification Search .............. 359/694
See application file for complete search history.

(56) References Cited

U.S. PATENT DOCUMENTS 6,497,520 B2   12/2004   Omiya

| 2002/0136150 | A1* | 9/2002  | Mihara et al. .......... 369/125 |
| 2005/0006980 | A1* | 1/2005  | Horst ..................... 310/309 |
| 2005/0249487 | A1* | 11/2005 | Gutierrez ................ 396/85 |
| 2006/0092514 | A1* | 5/2006  | Koo et al. .............. 359/557 |
| 2006/0285841 | A1* | 12/2006 | Masui et al. ............ 396/72 |

FOREIGN PATENT DOCUMENTS

JP   2005-177288   *   6/2005

* cited by examiner

*Primary Examiner*—Jordan M. Schwartz
*Assistant Examiner*—James C Jones
(74) *Attorney, Agent, or Firm*—Frank R. Niranjan

(57) ABSTRACT

A compact zoomable camera device includes an optical module, an image sensor module and a microelectronic mechanism system (MEMS) micro-actuator. The optical module includes a first lens group, a second lens group and a light directing unit. The first lens group defines a first optical axis, and the second lens group defines a second optical axis and a second focal plane associated therewith. The second lens group is arranged in a manner such that the second optical axis intersects the first optical axis. The light directing unit is configured for directing light beams from the first lens group to the second lens group. The image sensor module includes an image sensor positioned at the second focal plane of the second lens group. The microelectronic mechanism system (MEMS) micro-actuator is configured for moving the image sensor along the second optical axis, so as to dynamically position the image sensor at the second focal plane of the second lens group.

20 Claims, 1 Drawing Sheet

COMPACT ZOOMABLE CAMERA DEVICE FOR PORTABLE DIGITAL ELECTRONIC DEVICES

TECHNICAL FIELD

The present invention relates to a zoomable camera device, and particularly to a zoomable camera device, driven by a MEMS (micro-electronic mechanism system) micro-actuator, the camera device may also be integrated with other portable digital electronic devices.

BACKGROUND

In recent years portable digital electronic device have become more and more popular, among which those equipped with integral cameras have been particularly successful. Despite this commercial success, without zooming and auto-focusing functions, integrated digital camera device are more like toys and ornaments rather than real cameras. However, the portable digital devices are usually small in size and often rely on small batteries for power. Thus, unlike conventional camera devices, portable digital electronic devices can provide little space and power to accommodate the driving devices necessary for zooming and auto-focusing.

Therefore, a compact zooming camera device having a compact driving device for driving a zooming or auto-focusing apparatus is desired.

SUMMARY

A compact zoomable camera device includes an optical module, an image sensor module and a microelectronic mechanism system (MEMS) micro-actuator. The optical module includes a first lens group, a second lens group and a light directing unit. The first lens group defines a first optical axis, and the second lens group defines a second optical axis and a second focal plane associated therewith. The second lens group is arranged in a manner such that the second optical axis intersects the first optical axis. The light directing unit is configured for directing light beams from the first lens group to the second lens group. The image sensor module includes an image sensor positioned at the second focal plane of the second lens group. The microelectronic mechanism system (MEMS) micro-actuator is configured for moving the image sensor along the second optical axis, so as to dynamically position the image sensor at the second focal plane of the second lens group.

Advantages and novel features will become more apparent from the following detailed description when taken in conjunction with the accompanying drawing.

BRIEF DESCRIPTION OF THE DRAWING

Many aspects of the present compact zoomable camera device can be better understood with reference to the following drawing. The components in the drawing are not necessarily drawn to scale, the emphasis instead being placed upon clearly illustrating the principles of the present compact zoomable camera device. Moreover, in the drawing, like reference numerals designate corresponding parts throughout the view.

DETAILED DESCRIPTION OF PREFERRED EMBODIMENT

Figure 1:
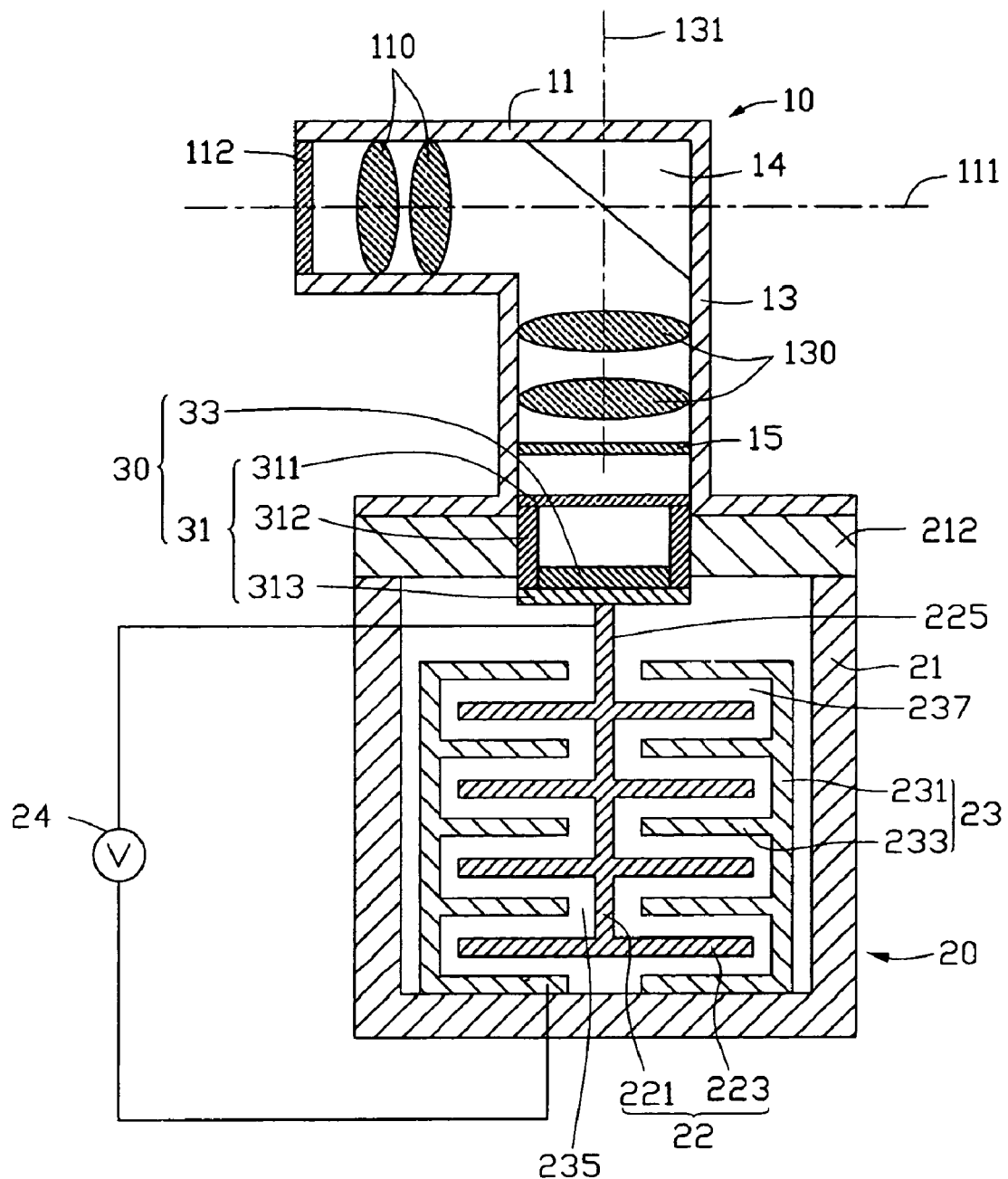
FIG. 1 is a schematic, cross-sectional view of a compact zoomable camera device according to a preferred exemplary embodiment.

Referring to FIG. 1, there is shown a compact zoomable camera device 100 for a portable electronic device. The compact zoomable camera device 100 includes an optical module 10, a microelectronic mechanism system (MEMS) micro-actuator 20 and an image sensor module 30.

The optical module 10 is adapted for capturing images and focusing the images onto a certain focal plane thereof. The optical module 10 includes a first lens group 110, a second lens group 130, a light directing unit 14, a protective plate 112, a first barrel 11, a second barrel 13, and an infrared cut filter 15. The first and second lens groups 110, 130 respectively includes at least two lenses that can be moved relative to each other, by which a focal distance of the first and second lens groups 110, 130 can be respectively adjusted. The first lens group 110 defines a first optical axis 111, and the second lens group 130 defines a second optical axis 131 and a second focal plane. The first lens group 110 is arranged in a manner such that the second optical axis 131 intersects the first optical axis 111. In the illustrated exemplary embodiment, the first optical axis 111 perpendicularly intersects the second optical axis 131. The protective plate 112 and the first lens group 110 are fixed inside the first barrel 11. The second lens group 130 and the infrared cut filter 15 are fixed inside the second barrel 13. The first barrel 11 is combined with the second barrel 13, preferably perpendicularly to each other and forming a L-shaped structure. The light directing unit 14 is configured at a corner of the L-shaped structure for directing light beams from the first lens group 110 to the second lens group 130. The light directing unit 14 can be either a reflecting mirror or a beam splitter.

In the first barrel 11, the lenses of the first lens group 110 are axially aligned, and the protective plate 112 is parallel to each lens of the first lens group 110. In the second barrel 13, the lenses of the second lens group 130 are axially aligned, and the infrared cut filter 15 is configured substantially parallel with the second focal plane associated with the second lens group 130. The lenses of the first and second lens group 110, 130 can be spherical lenses or aspheric lenses. Advantageously, aspheric lenses are more preferable, as they facilitate miniaturization of the first and the second lens group 110, 130. Such lenses can be made of either glass or plastic materials.

In the present compact zoomable camera device 100, the optical module 10 is designed into a L-shaped structure, and arranging the light directing unit 14 at the corner of the L-shaped structure to direct light beams from the first lens group 110 to the second lens group 130. In this design, a length of the second barrel 13 in the direction along the second optical axis 13 can be greatly reduced. Therefore, the compactness of the compact zoomable camera device 100 can be increased.

The image sensor module 30 is designed to receive the images and convert the images into electronic signals. The image sensor module 30 includes a housing 31 and an image sensor 33 enclosed in the housing 31 so as to protect the image sensor 33 from contamination. The housing 31 is comprised of a top transparent window 311, a sidewall 312, and a bottom base 313. As shown in FIG. 1, the image sensor module 30 is positioned below the infrared cut filter 15 and is movable in the second barrel 13 along the second optical axis 131 of the second lens group 130. The sidewall 312 of the housing 31 contacts an inside surface of the second barrel 13. The image sensor 33 is disposed on the base 313 and is both in axial alignment with and positioned below the second lens group 130, and is designed so as to move along the second optical axis 131 of the second lens group 130. The transparent window 311, the image sensor 33, the base 313, the infrared cut filter 15 and each lens of the second lens group 130 are disposed substantially parallel to each other. The image sensor 33 can be a complementary metal-oxide semiconductor (CMOS) device or a charge coupled device (CCD).

The MEMS micro-actuator 20 is designed so as to move the image sensor 33 along the second optical axis 131, dynamically positioning the image sensor 33 at an instant focal plane of the second lens group 130. According to an embodiment of the present compact zoomable camera device 100, the MEMS micro-actuator 20 is made of a semiconductor material, such as single crystal silicon. The MEMS micro-actuator 20 includes an enclosure 21, a rotor part 22, a rotor housing 23, and a power supply 24. The rotor part 22 and the rotor housing 23 are received in the enclosure 21.

As shown in FIG. 1, the rotor housing 23 includes a cylindrical sidewall 231, and a plurality of plates 233 extending from the sidewall 231 inwardly. The plates 233 cooperatively define a channel 235 along a center axis of the MEMS micro-actuator 20. Each two adjacent plates 233 define a gap 237 therebetween. The rotor part 22 is of a shape corresponding to an inner surface of the rotor housing 23. The rotor part 22 includes a shaft 221 received in the channel 235, and a plurality of torsional radial extensions 223 extending from the shaft 221 toward the sidewall 231 in the gaps 237. The channel 235 and the gaps 237 allow the rotor part 22 to rotate around an axis of the shaft 221, and to move along the center axis of the MEMS micro-actuator 20. The enclosure 21 includes an internal side surface and an internal bottom surface. The shaft 221 is vertical to the internal bottom surface of the enclosure 21. An end 225 of the shaft 221 extends outwardly through an opening in the rotor housing 23 to connect with the base 313 of the image sensor module 30, and the other end of the shaft 221 is suspended over and spaced from the internal bottom surface of the enclosure 21, so as to be capable of moving the image sensor 33 up and down along the second optical axis 131 of the second lens group 130. That is, the image sensor module 30 is actuated by the end 225 of the shaft 221 to move in the second barrel 13 or partially in the second barrel 13 along the second optical axis 131 of the second lens group 130. Therefore, the image sensor 33 enclosed in the housing 31 can be moved along the second optical axis 131 of the second lens group 130. According to an embodiment of the present compact zoomable camera device 100, the second barrel 13, the second lens group 130, the image sensor 33, the rotor part 22, and the rotor housing 23 are configured parallel to each other, and share a common center axis.

The power supply 24 is coupled between the rotor part 22 and the rotor housing 23. The power supply 24 is either an alternating current (AC) power supply or a direct current (DC) power supply. The voltage provided by the power supply 24 is adjustable within a predetermined range, extending from positive to negative and vice versa.

When the power supply 24 applies a voltage between the rotor part 22 and the rotor housing 23, the rotor part 22 oscillates at resonance frequencies in a high frequency range, then exerting a torsional force which drives the rotor part 22 to rotate relative to the rotor housing 23 around their common axis. Accordingly, an attractive force develops between the plates 233 and the torsional radial extensions 223 to drive the rotor part 22 to move along the common axis.

Alternatively, another embodiment of the present zoomable camera device 100 further includes a position sensor for detecting the exact position of the image sensor 33, thus generating a feed-back signal which controls the movement of the micro-actuator 20.

In operation, when the present compact zoomable camera device 100 is auto-focusing or zooming, the first and second lens group 110, 130 have their focal distance adjusted to a required length, then the second focal plane also shifts accordingly. A distance from an original position of the image sensor 33 to the instant second focal plane is then calculated. Instructed by the calculated distance, the rotor part 22 then drives the image sensor 33 from the original position to the instant second focal plane after the second lens group 130 has been adjusted.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A compact zoomable camera device, comprising:
    an optical module for capturing an image of an object, the optical module comprising:
        a first lens group defining a first optical axis;
        a first barrel for receiving the first lens group;
        a second lens group defining a second optical axis and a second focal plane associated therewith, the second lens group being arranged in a manner such that the second optical axis perpendicularly intersects the first optical axis;
        a second barrel for receiving the second lens group;
        a light directing unit configured for directing light beams from the first lens group to the second lens group;
    an image sensor module comprising:
        an image sensor positioned at the second focal plane of the second lens group; and
        a housing enclosing the image sensor for protecting the image sensor from contamination, the housing being movable in the second barrel along the second optical axis of the second lens group; and
    a microelectronic mechanism system (MEMS) micro-actuator configured for moving the image sensor along the second optical axis, so as to dynamically position the image sensor at the second focal plane of the second lens group.

2. The compact zoomable camera device as described in claim 1, wherein the light directing unit comprises a reflecting mirror or a beam splitter.

3. The compact zoomable camera device as described in claim 1, wherein the optical module further comprises a protective plate fixed to the first barrel.

4. The compact zoomable camera device as described in claim 1, wherein the optical module further comprises an infrared cut filter configured to be substantially parallel with the second focal plane associated with the second lens group and fixed inside the second barrel.

5. The compact zoomable camera device as described in claim 1, wherein the housing comprises a top transparent window, a sidewall and a bottom base, and the image sensor is disposed on the base spatially corresponding to the second lens group.

6. The compact zoomable camera device as described in claim 5, wherein the MEMS micro-actuator comprises a rotor housing, a rotor part, and a power supply.

7. The compact zoomable camera device as described in claim 6, wherein the rotor housing comprises:
   a sidewall; and
   a plurality of plates extending inwardly from an inner surface of the sidewall of the rotor housing;
   wherein the plates cooperatively define a channel along a center axis of the MEMS micro-actuator and each two adjacent plates define a gap;
   and the rotor part comprises:
   a shaft received in the channel; and
   a plurality of torsional radial extensions extending from the shaft toward the sidewall of the rotor housing into the gaps.

8. The compact zoomable camera device as described in claim 6, wherein the power supply is coupled between the rotor housing and the rotor part.

9. The compact zoomable camera device as described in claim 1, wherein the MEMS micro-actuator is made of single crystal silicon.

10. The compact zoomable camera device as described in claim 1, wherein the first lens group and the second lens group each comprise at least one aspheric lens.

11. The compact zoomable camera device as described in claim 7, wherein the MEMS micro-actuator comprises an enclosure for receiving the rotor housing and the rotor part.

12. The compact zoomable camera device as described in claim 11, wherein the enclosure comprises an internal side surface and an internal bottom surface, and the shaft of the rotor part is vertical to the internal bottom surface of the enclosure.

13. The compact zoomable camera device as described in claim 12, wherein one end of the shaft extends outwardly through an opening in the rotor housing to connect with the base of the image sensor module, and the other end of the shaft is suspended over and spaced from the internal bottom surface of the enclosure, and thereby the image sensor module is capable of being moved in the second barrel or partially in the second barrel along the second optical axis of the second lens group.

14. The compact zoomable camera device as described in claim 13, wherein the sidewall of the housing contacts an inside surface of the second barrel.

15. A compact zoomable camera device, comprising:
   an optical module for capturing an image of an object, the optical module comprising:
      a first lens group defining a first optical axis;
      a first barrel receiving the first lens group;
      a second lens group defining a second optical axis and a second focal plane associated therewith, the second lens group being arranged in a manner such that the second optical axis intersects the first optical axis;
      a second barrel receiving the second lens group;
      a light directing unit configured for directing light beams from the first lens group to the second lens group;
   an image sensor module comprising:
      an image sensor positioned at the second focal plane of the second lens group; and
      a housing enclosing the image sensor for protecting the image sensor from contamination, the housing being movable in the second barrel along the second optical axis of the second lens group; and
   a microelectronic mechanism system (MEMS) micro-actuator configured for moving the image sensor along the second optical axis, so as to dynamically position the image sensor at the second focal plane of the second lens group.

16. The compact zoomable camera device as described in claim 15, wherein the housing comprises a top transparent window, a sidewall, and a bottom base, the sidewall of the housing contacts an inside surface of the second barrel, and the image sensor is disposed on the base spatially corresponding to the second lens group.

17. The compact zoomable camera device as described in claim 15, wherein the MEMS micro-actuator comprises a rotor housing, a rotor part, and a power supply coupled between the rotor housing and the rotor part.

18. The compact zoomable camera device as described in claim 17, wherein the rotor housing comprises:
   a sidewall; and
   a plurality of plates extending inwardly from an inner surface of the sidewall;
   wherein the plates cooperatively define a channel along a center axis of the MEMS micro-actuator and each two adjacent plates define a gap therebetween;
   and the rotor part comprises:
   a shaft received in the channel; and
   a plurality of torsional radial extensions extending from the shaft toward the sidewall into the gaps.

19. The compact zoomable camera device as described in claim 18, wherein the MEMS micro-actuator comprises an enclosure for receiving the rotor housing and the rotor part, the enclosure comprises an internal side surface and an internal bottom surface, and the shaft of the rotor part is vertical to the internal bottom surface of the enclosure.

20. The compact zoomable camera device as described in claim 19, wherein one end of the shaft extends outwardly through an opening in the rotor housing to connect with the image sensor module, and the other end of the shaft is suspended over and spaced from the internal bottom surface of the enclosure, and thereby the image sensor module is capable of being moved in the second barrel or partially in the second barrel along the second optical axis of the second lens group.

* * * * *